US007558565B2

(12) United States Patent
Miller et al.

(10) Patent No.: US 7,558,565 B2
(45) Date of Patent: Jul. 7, 2009

(54) METHODS AND APPARATUS FOR WIRELESS NETWORK LOAD GENERATOR CLUSTERING

(75) Inventors: Douglas M. Miller, Santa Barbara, CA (US); Ken Balmy, Santa Barbara, CA (US); Jeff A Bechdol, Santa Barbara, CA (US)

(73) Assignee: IXIA, Calabasas, CA (US)

( * ) Notice: Subject to any disclaimer, the term of this patent is extended or adjusted under 35 U.S.C. 154(b) by 908 days.

(21) Appl. No.: 11/022,156

(22) Filed: Dec. 22, 2004

(65) Prior Publication Data

US 2005/0201293 A1 Sep. 15, 2005

Related U.S. Application Data

(60) Provisional application No. 60/533,290, filed on Dec. 29, 2003.

(51) Int. Cl.
*H04Q 7/20* (2006.01)

(52) U.S. Cl. ........................ 455/423; 455/424; 455/425

(58) Field of Classification Search ................ 455/423, 455/424, 425
See application file for complete search history.

(56) References Cited

U.S. PATENT DOCUMENTS

| | | | |
|---|---|---|---|
| 6,272,450 | B1 | 8/2001 | Hill |
| 6,601,020 | B1 | 7/2003 | Myers |
| 6,628,965 | B1 | 9/2003 | LaRosa |
| 6,724,730 | B1 | 4/2004 | Mlinarsky |
| 7,075,893 | B1 | 7/2006 | Mlinarsky |
| 7,099,438 | B2 | 8/2006 | Rancu et al. |
| 2002/0138226 | A1 | 9/2002 | Doane |
| 2003/0009544 | A1 | 1/2003 | Wach |
| 2003/0139919 | A1 | 7/2003 | Sher |
| 2003/0202486 | A1 | 10/2003 | Anton |
| 2003/0231741 | A1 | 12/2003 | Rancu et al. |
| 2003/0236089 | A1 | 12/2003 | Beyme |
| 2005/0053008 | A1 | 3/2005 | Griesing |
| 2005/0141469 | A1 | 6/2005 | Miller et al. |
| 2006/0229018 | A1 | 10/2006 | Mlinarsky |

OTHER PUBLICATIONS

U.S. Appl. No. 10/776,413, Mlinarsky.

*Primary Examiner*—Temica M Beamer
(74) *Attorney, Agent, or Firm*—SoCal IP Law Group LLP; Steven C. Sereboff; Mark A. Goldstein

(57) ABSTRACT

Methods and hardware for combining multiple, independent, wireless station (or user) emulating, load generators into a cluster, which is a group of independent wireless network load emulators working together to provide arbitrarily large, coordinated 802.11 user communities. A single command, control, and reporting mechanism establishes connections to the load generator nodes making up the cluster, distributes work to the nodes, and collects statistical data from the nodes. Alternate routing simplifies the routing of commands, control requests, and requests for statistical results when only a single load generator node is addressed.

5 Claims, 2 Drawing Sheets

100
WIRELESS NETWORK LOAD GENERATOR CLUSTER
102
COMMAND CONTROL AND REPORTING COMPUTER
104
HUB
110-1
110-2
110-n
106-1
LOAD GENERATOR NODE 1
106-2
LOAD GENERATOR NODE 2
106-n
LOAD GENERATOR NODE N
112
108
1
2
64
EMULATED USER
114-1
114-2
114-n
802.11
116
WIRELESS SYSTEM UNDER TEST

NODE LIST
200
198
WORK REQUEST
210
CLUSTER INTERFACE
212
222
214
216
226
WORK MANAGEMENT AND DISTRIBUTION
218
220
COMMAND AND CONTROL CONNECTION MANAGEMENT
202
204
REPORT CONNECTION MANAGEMENT
206
208
LOAD GENERATOR NODE j
106-1
106-2
106-n

METHODS AND APPARATUS FOR WIRELESS NETWORK LOAD GENERATOR CLUSTERING

CROSS-REFERENCE TO A RELATED APPLICATION

This application is entitled to, and claims, the benefit of the 29 Dec. 2003 filing date of provisional application No. 60/533,290.

TECHNICAL FIELD OF INVENTION

The present invention relates generally to the field of data communications and, specifically to the testing of wireless networks. This invention can be used to advantage by wireless network development engineers, network administrators, and network performance testing organizations.

BACKGROUND OF INVENTION

Many, including development engineers, network administrators, and network testing organizations, have occasion to test the performance and scalability of wireless networks. The accepted practice for testing wireless networks is to install numerous computers with wireless network capability. This common practice is expensive as it driven by the cost of the many necessary computers, and the test setup is not easily configurable for a variety of user population sizes and data traffic loads.

There is accordingly an existing and continuing need for methods and hardware for testing wireless networks, which have the capability of significantly reducing the cost of the testing and which easily accommodate a wide variety of user populations and traffic loads.

SUMMARY OF THE INVENTION

Such needs are met by the present invention which establishes a method of, and provides hardware for, combining multiple, independent, wireless load generators, which emulate wireless stations, into a coordinated network called a cluster. The cluster of independent wireless load generators operates as a single system. Because this cluster is composed of independent load generators nodes, the cluster can be scaled to the load necessary to test the wireless system under test by adding and/or removing nodes in the cluster.

The objects, features, and advantages of the present invention will be apparent to the reader from the foregoing and the appended claims and as the ensuing detailed description and discussion of the invention proceeds in conjunction with the accompanying drawings.

DETAILED DESCRIPTION OF THE INVENTION

Figure 1:
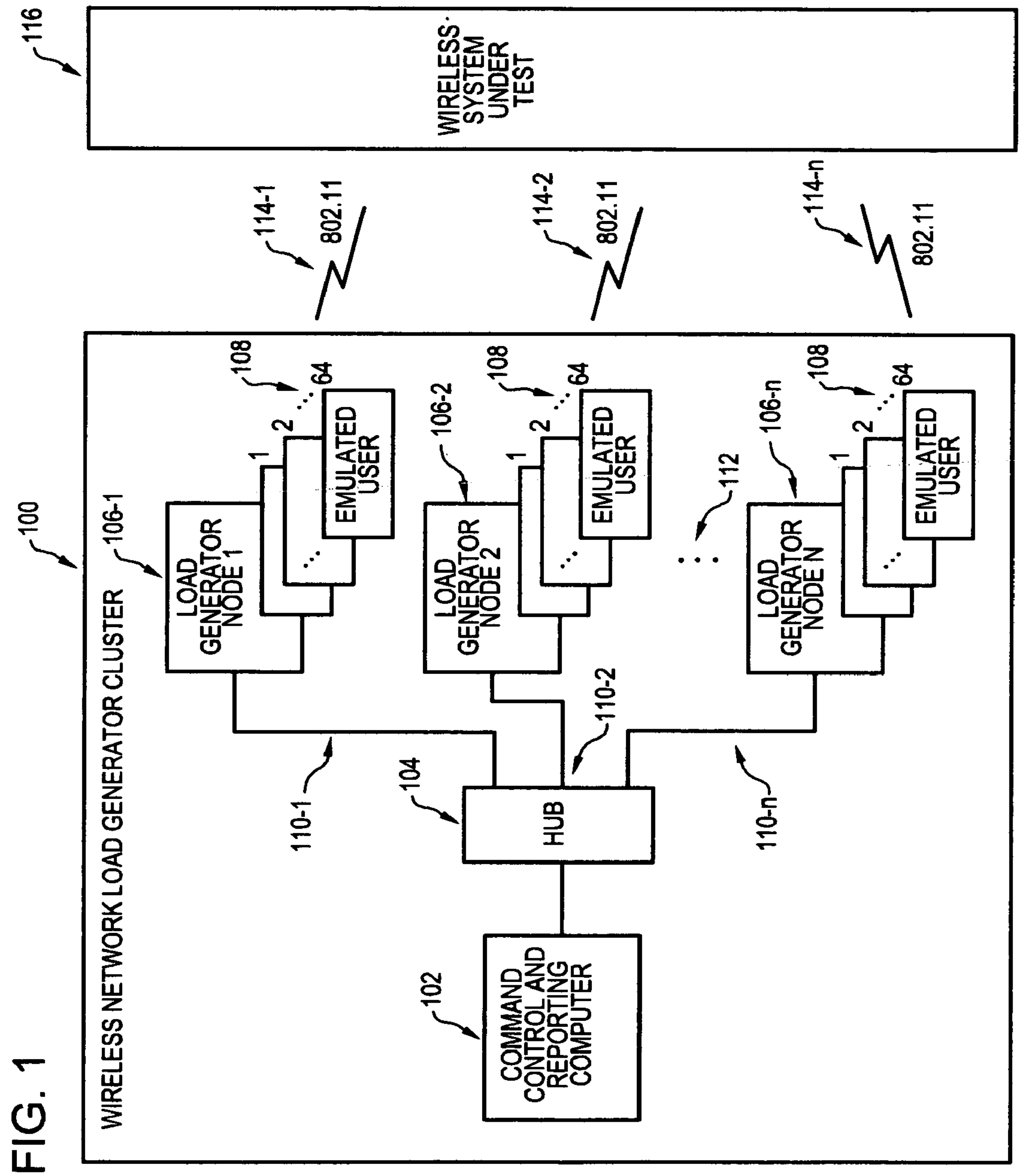
FIG. 1 is a block diagram illustrating a typical clustering environment comprising a command, control, and reporting computer connected to a collection of independent load generators and a single wireless system under test (such as a wireless switch or access point) in accord with the principles of the present invention.

FIG. 1 shows, in block diagram form, a wireless network load generator cluster 100. This load generator cluster consists of a command, control and reporting computer 102 connected to an 802.3 hub 104. Load generator nodes 106 that each emulate up to 64 virtual 802.11 stations 108 are connected to hub 104 via 802.3 connections 110. Representative nodes 106-1, 106-2, and **106-*n* and corresponding connections 110-1, 110-2, and 110-*n*** are shown in the drawings.

The total number of load generator nodes 106 in the cluster is both variable and scalable as indicated vertical dotted line 112.

Each emulated virtual station 108 communicates via an 802.11 wireless connection with the wireless system 116 under test. Representative connections 114-1, 114-2, and **114-*n*** are shown in the drawing.

Each load generator node 106 controls a user population of up to 64 virtual stations 108 as disclosed above. Each wireless network load generator cluster 100 has and controls up to some arbitrary number of load generator nodes 106.

Figure 2:
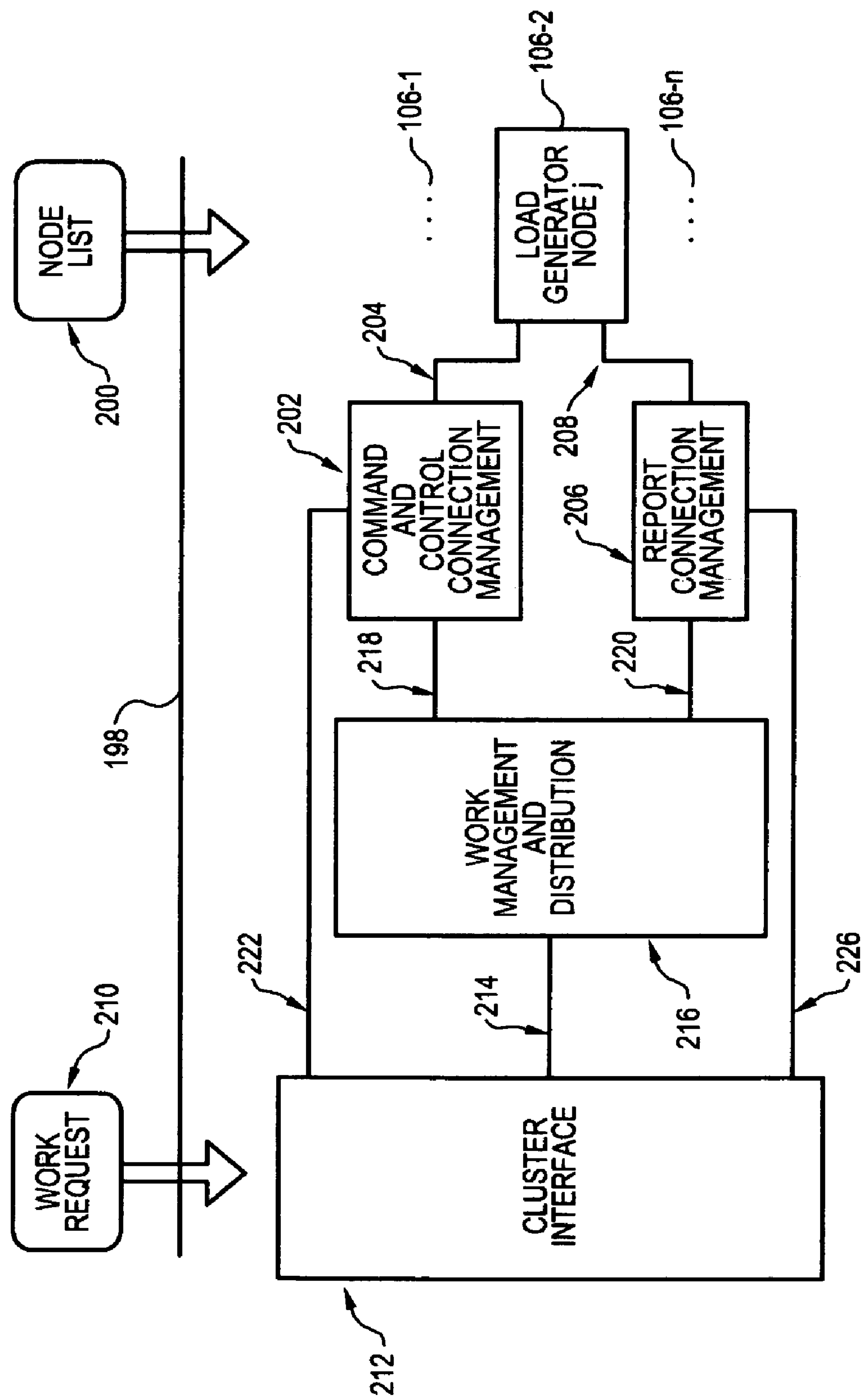
FIG. 2 is a block diagram illustrating the functional relationship among the components of the load generator cluster.

Referring next to FIG. 2, a clustering meta-process system 198 within the command, control, and reporting computer 102 (FIG. 1) is responsible for load generator node management and coordination. The cluster process is instantiated—i.e., initialized and made ready to accept work requests as described below—using a list 200 enumerating the IP addresses of the load generator nodes 106 that will form cluster 100. Thus, the node list uniquely identifies each of the wireless node generators in a cluster. These nodes are not part of meta-process system 198.

A new node 106 is added to cluster 100 by physically connecting it to the cluster and informing the cluster that the new node exists. This may be done by way of a work request or by providing a new node address list 200.

To remove a node from cluster 100, it must be removed from node address list 200 before cluster 100 is instantiated or removed by using a work request. Once the node is removed from the clustering meta-process system 198, it may be physically removed.

For each node 106 in node address list 200, the cluster process system 198 maintains two 802.3 connections. Specifically, a command and control connection management subsystem 202 manages a command and control connection 204 to each node 106. A reporting connection management subsystem 206 manages a reporting connection 208 to each node 106. Once all connections are established, load generator cluster 100 becomes operational.

Work requests 210 for cluster 100 are received by cluster interface 212, forwarded through connection 214 to work management and distribution subsystem 216, and distributed to constituent load generator nodes 106 by the work management and distribution subsystem 216 through connection 218, the command and control management subsystem 202, and connections 204.

A work request is an operation to be performed by cluster 100. This work request may come from the human user directly using the cluster interface 212 or from a software program using the cluster interface. Exemplary work requests might create 5000 emulated wireless users, bring all emulated users to the 802.11 associated state, and/or instruct all emulated wireless users to begin sending and receiving data.

Statistical results are collected from the constituent load generator nodes 106 by the clustering process via reporting connections 208 and reporting connection management subsystem 206, transferred to work management and distribution subsystem 216 through connection 220, and then routed to cluster interface 212 through connection 214. The statistical results are standard 802.11 statistics that a load generator collects. These include, among others, various 802.11 frames, transmitted/received errors, and data transfer rates.

Work requests 210 received by cluster interface 212 that address a specific node 106 bypass the work management and distribution subsystem 216 and communicate directly with that specific node through connection 222, command and control connection management subsystem 202, and command and control connection 204 for commands and control requests and through connection 208, reporting connection management subsystem 206, and a reporting connection 226 for statistics.

The present invention, as described above is unique in that it provides, among other advantages:

1. arbitrarily large, coordinated communities of 802.11 wireless virtual stations for scalability and performance testing of 802.11 wireless systems including, but not limited to, enterprise-wide wireless networks, metropolitan-wide wireless networks, wireless local area network switches, and access points;

2. a mechanism for adding, removing, and reconfiguring wireless virtual user capabilities as new capabilities are developed and deployed, while preserving investment in and capabilities of existing deployed systems;

3. a single point of command, control, and reporting capabilities;

4. a mechanism for testing diverse wireless network topologies;

5. a mechanism for testing geographically dispersed, wireless network access points.

The present invention may be embodied in other specific forms without departing from the spirit or essential characteristics thereof. The present embodiment is therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed is:

1. A scalable testing system for testing a wireless communication system, the testing system comprising:

a clustering system to manage and coordinate the operation of multiple load generator nodes, the clustering system including at least one cluster of independent, wireless, load generator nodes, wherein the cluster is configured to operate as a single entity, and wherein the load generator nodes can be added to and removed from the cluster in which the load generator node is included;

each of the load generator nodes capable of emulating multiple virtual wireless stations;

a wireless connection between each virtual wireless station and a wireless system under test;

a command and control management system having a command and control connection to each load generator node, the command and control management system to manage the command and control connections;

a work management and distribution system to receive cluster work requests from the clustering system, prepare load generator work requests based on the cluster work requests, and to distribute load generator work requests to load generator nodes in each of the at least one cluster via the command and control management system, the load generator work requests specifying operations to be performed by the load generator nodes;

a reporting connection management system having a reporting connection to each load generator node, the reporting connection management system to manage the reporting connections and receive statistics from the load generator nodes over the reporting connections.

2. A method for testing a wireless communication system using a cluster of independent, wireless, load generator nodes which operate as a single system and which are each capable of emulating multiple virtual wireless stations, the method comprising:

receiving a list of addresses corresponding to the load generator nodes;

initializing the cluster including the load generator nodes in the node list, wherein each of the load generator nodes emulates multiple virtual wireless stations;

establishing and maintaining a wireless command and control connection and a wireless reporting connection to each load generator in the node list;

receiving a cluster work request;

preparing a plurality of load generator work requests to implement the cluster work request;

distributing load generator work requests to the load generator nodes via the wireless command and management connections, the load generator work requests causing the load generator nodes to establish and maintain wireless connections between the virtual wireless stations and a wireless system under test;

receiving statistics via the wireless reporting connections.

3. The method of claim 2 wherein the distributing comprises:

forwarding directly to a particular load generator node through its wireless command and management connection load generator work requests addressed specifically to the particular load generator node.

4. A system comprising:

a computer coupled to a hub, wherein the hub conforms to an IEEE 802.3 standard;

a plurality of independent, wireless, load generator nodes coupled to the hub, each of the load generator nodes capable of emulating a plurality of virtual wireless stations, conforming to an IEEE 802.11 standard, and configured to communicate wirelessly with a wireless system under test;

wherein the computer is configured to manage the load generator nodes as a cluster;

wherein the computer is configured to receive a cluster work request;

wherein the computer is configured to prepare load generator work requests based on the cluster work request;

wherein the computer is configured to maintain two connections to each of the load generator nodes via the hub, the two connections being a command and control connection and a reporting connection;

wherein the computer is configured to send load generator work requests to the load generator nodes via the command and control connections and receive statistics from the load generator nodes via the reporting connections.

5. The system of claim 4 wherein at least some of the load generator nodes are removably coupled to the hub.

* * * * *